United States Patent
Dai et al.

(10) Patent No.: US 10,907,833 B2
(45) Date of Patent: Feb. 2, 2021

(54) AXIAL STAGED COMBUSTOR WITH RESTRICTED MAIN FUEL INJECTOR

(71) Applicant: UNITED TECHNOLOGIES CORPORATION, Farmington, CT (US)

(72) Inventors: Zhongtao Dai, Manchester, CT (US); Adam Takashi Holley, Manchester, CT (US); Randal G. McKinney, Ellington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 683 days.

(21) Appl. No.: 15/109,158

(22) PCT Filed: Jan. 5, 2015

(86) PCT No.: PCT/US2015/010082
§ 371 (c)(1),
(2) Date: Jun. 30, 2016

(87) PCT Pub. No.: WO2015/147951
PCT Pub. Date: Oct. 1, 2015

(65) Prior Publication Data
US 2016/0320063 A1 Nov. 3, 2016

Related U.S. Application Data

(60) Provisional application No. 61/931,128, filed on Jan. 24, 2014.

(51) Int. Cl.
*F23R 3/00* (2006.01)
*F23R 3/34* (2006.01)
(Continued)

(52) U.S. Cl.
CPC ............. *F23R 3/346* (2013.01); *F02C 3/04* (2013.01); *F23R 3/12* (2013.01); *F23R 3/286* (2013.01); *F23R 3/343* (2013.01); *F05D 2220/32* (2013.01)

(58) Field of Classification Search
CPC .. F23R 3/343; F23R 3/02; F23R 3/002; F23R 3/18; F23R 3/346; F23D 11/406
See application file for complete search history.

(56) References Cited

U.S. PATENT DOCUMENTS 5,826,423 A * 10/1998 Lockyer ................. F23C 7/008
60/39.463
6,253,538 B1 7/2001 Sampath et al.
(Continued)

FOREIGN PATENT DOCUMENTS

EP 1067337 A1 1/2001
EP 2481987 A2 8/2012
(Continued)

OTHER PUBLICATIONS

Supplementary European Search Report for European Application No. 15768006.7 dated Sep. 15, 2017.
(Continued)

*Primary Examiner* — Todd E Manahan
*Assistant Examiner* — Katheryn A Malatek
(74) *Attorney, Agent, or Firm* — Carlson, Gaskey & Olds, P.C.

(57) ABSTRACT

A combustor for a gas turbine engine comprises a combustion chamber having a pilot injector at one end and at least one main injector spaced radially from the pilot injector. The main injector includes a fluid flow path with a plug that restricts flow at least at an interior portion of the flow path. A gas turbine engine is also disclosed.

20 Claims, 4 Drawing Sheets

(51) Int. Cl.
*F23R 3/28* (2006.01)
*F23R 3/12* (2006.01)
*F02C 3/04* (2006.01)

(56) References Cited

U.S. PATENT DOCUMENTS

| | | |
|---|---|---|
| 6,324,828 B1 | 12/2001 | Willis et al. |
| 6,625,971 B2 * | 9/2003 | Graves .................... F23D 11/14 |
| | | 239/599 |
| 7,134,286 B2 | 11/2006 | Markarian et al. |
| 7,140,189 B2 | 11/2006 | Markarian et al. |
| 7,185,497 B2 | 3/2007 | Dudebout et al. |
| 7,269,958 B2 | 9/2007 | Stastny et al. |
| 7,308,794 B2 | 12/2007 | Morenko et al. |
| 7,559,202 B2 | 7/2009 | Prociw et al. |
| 7,565,803 B2 | 7/2009 | Li et al. |
| 7,624,576 B2 | 12/2009 | Alkabie et al. |
| 7,658,339 B2 | 2/2010 | Prociw et al. |
| 7,716,931 B2 | 5/2010 | Mancini et al. |
| 7,721,436 B2 | 5/2010 | Prociw et al. |
| 7,762,073 B2 | 7/2010 | Li et al. |
| 7,942,003 B2 | 5/2011 | Baudoin et al. |
| 7,950,233 B2 | 5/2011 | Alkabie et al. |
| 8,061,142 B2 | 11/2011 | Kastrup et al. |
| 8,146,365 B2 | 4/2012 | Shum et al. |
| 8,171,736 B2 | 5/2012 | Hawie et al. |
| 8,312,724 B2 | 11/2012 | Dai et al. |
| 8,459,017 B2 | 6/2013 | Paterson et al. |
| 9,920,693 B2 | 3/2018 | Hanson |
| 10,054,312 B2 | 8/2018 | Dai et al. |
| 2002/0178727 A1 * | 12/2002 | Halila ...................... F01D 5/08 |
| | | 60/740 |
| 2003/0046935 A1 | 3/2003 | Halila et al. |
| 2007/0289305 A1 | 12/2007 | Oda et al. |
| 2008/0236165 A1 | 10/2008 | Baudoin et al. |
| 2009/0084082 A1 | 4/2009 | Martin et al. |
| 2010/0162710 A1 * | 7/2010 | Senior .................... F23R 3/286 |
| | | 60/737 |
| 2011/0067402 A1 | 3/2011 | Wiebe et al. |
| 2011/0289928 A1 * | 12/2011 | Fox .......................... F23R 3/286 |
| | | 60/740 |
| 2012/0186202 A1 | 7/2012 | Pandurangan et al. |
| 2013/0125549 A1 | 5/2013 | Bailey et al. |
| 2013/0232980 A1 | 9/2013 | Chen et al. |
| 2016/0003156 A1 | 1/2016 | Hanson |
| 2016/0195271 A1 | 7/2016 | Köstlin et al. |
| 2016/0245522 A1 | 8/2016 | Dai et al. |

FOREIGN PATENT DOCUMENTS

| | | |
|---|---|---|
| EP | 3062022 A1 | 8/2016 |
| WO | 2013043076 A1 | 3/2013 |
| WO | 2015/147951 A2 | 10/2015 |

OTHER PUBLICATIONS

International Preliminary Report on Patentability for International Application No. PCT/US2015/010082 dated Aug. 4, 2016.
The International Search Report and Written Opinion for PCT Application No. PCT/US2015/010082, dated Sep. 24, 2015.
European Search Report for EP Application No. 17195301.1 dated Oct. 29, 2018.

* cited by examiner

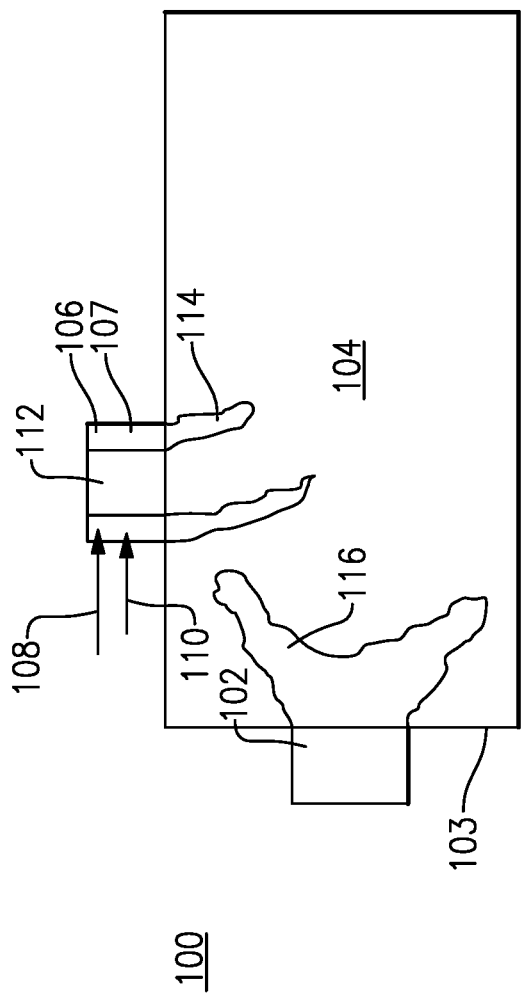
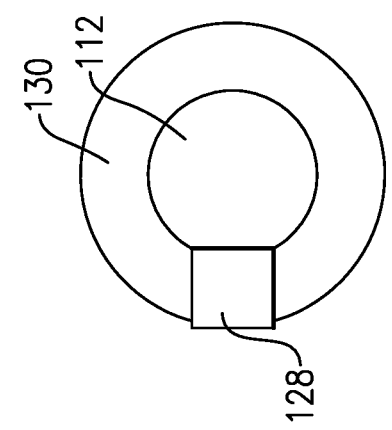
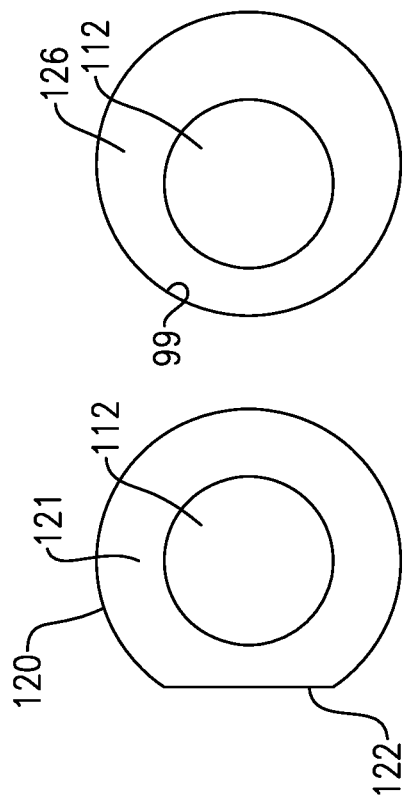
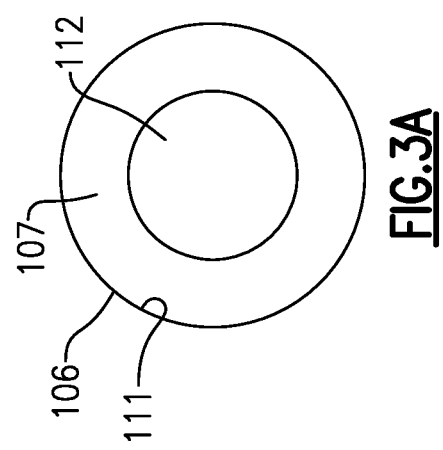

AXIAL STAGED COMBUSTOR WITH RESTRICTED MAIN FUEL INJECTOR

CROSS-REFERENCE TO RELATED APPLICATION

This application claims priority to U.S. Provisional Patent Application No. 61/931,128, filed Jan. 24, 2014.

STATEMENT REGARDING FEDERALLY SPONSORED RESEARCH OR DEVELOPMENT

This invention was made with government support under Contract No. NNC13TA45T, awarded by NASA. The Government has certain rights in this invention.

BACKGROUND OF THE INVENTION

This application relates to an axially staged combustor for a gas turbine engine, wherein the main injector includes a plug at an internal location.

Gas turbine engines are known and generally includes propulsion engine, power generation engine, auxiliary power unit, etc. Propulsion engines typically, include a fan delivering air into a bypass duct as propulsion air and further into a core engine, while power generation engines use the engine core to generation electric power. The core engine air passes through a compressor where it is compressed and then delivered into a combustor section. The air is mixed with fuel and ignited in the combustor section and products of this combustion pass downstream over turbine rotors.

The design of the combustor section is precise. The air is mixed with fuel through injectors and a number of different scenarios may be utilized. In one scenario, an axially staged combustor includes a front end or pilot injector which injects fuel into air within a combustion chamber. This is typically at an axially upstream end of the combustor section. A main injector is positioned radially outwardly from the pilot injector and injects a pre-mixed fuel and air mixture. Flames build around each of the two injectors, and are called as pilot and main flames. Generally, pilot flame ignites and supports main flame.

Generally, only the pilot injector is fueled at low power situations. Both the pilot and the main injectors are fueled at high power situations.

In the prior art, the main injector is a circular port injecting fuel/air mixture to the combustion chamber where it generates a flame. The flame from such circular port is longer than desirable, resulting longer combustor.

SUMMARY OF THE INVENTION

In a featured embodiment, a combustor for a gas turbine engine comprises a combustion chamber having a pilot injector at one end and at least one main injector spaced radially from the pilot injector. The main injector includes a fluid flow path with a plug that restricts flow at least at an interior portion of the flow path.

In another embodiment according to the previous embodiment, the plug is concentric within the flow path.

In another embodiment according to any of the previous embodiments, a leading edge of the flow path is generally flat. A remainder of a circumference of the flow path is generally circular.

In another embodiment according to any of the previous embodiments, the plug is mounted non-concentrically within the flow path.

In another embodiment according to any of the previous embodiments, the plug includes an extension that extends to provide a restricted portion at a leading edge of the flow path.

In another embodiment according to any of the previous embodiments, the main injector injects premixed air and fuel into the combustion chamber.

In another embodiment according to any of the previous embodiments, the main injector does not import swirl into a pre-mixed air and fuel.

In another embodiment according to any of the previous embodiments, the main injector induces swirl into a pre-mixed fuel and air.

In another embodiment according to any of the previous embodiments, the pilot injector injects fuel.

In another embodiment according to any of the previous embodiments, the main injector extends into a combustion chamber at an angle that is non-perpendicular and non-parallel to an inner wall of the combustor, through which the main injector extends, such that a direction of intermixed fuel and air expands as it enters a combustion chamber.

In another featured embodiment, a gas turbine engine comprises a compressor, a turbine, and a combustor section for receiving compressed air from the compressor. The compressed air is mixed with fuel. The combustor section includes a combustion chamber having a pilot injector at one end and at least one main injector spaced radially from the pilot injector. The main injector includes a fluid flow path with a plug that restricts flow at least at an interior portion of the flow path.

In another embodiment according to the previous embodiment, the plug is concentric within the flow path.

In another embodiment according to any of the previous embodiments, a leading edge of the flow path is generally flat. A remainder of a circumference of the flow path is generally circular.

In another embodiment according to any of the previous embodiments, the plug is mounted non-concentrically within the flow path.

In another embodiment according to any of the previous embodiments, the plug includes an extension that extends to provide a restricted portion at a leading edge of the flow path.

In another embodiment according to any of the previous embodiments, the main injector injects premixed air and fuel into the combustion chamber.

In another embodiment according to any of the previous embodiments, the main injector does not import swirl into a pre-mixed air and fuel.

In another embodiment according to any of the previous embodiments, the main injector induces swirl into a pre-mixed fuel and air.

In another embodiment according to any of the previous embodiments, the pilot injector injects fuel.

In another embodiment according to any of the previous embodiments, the main injector extends into a combustion chamber at an angle that is non-perpendicular and non-parallel to an inner wall of the combustor through which the main injector extends, such that a direction of intermixed fuel and air expands as it enters a combustion chamber.

These and other features may be best understood from the following drawings and specification.

BRIEF DESCRIPTION OF THE DRAWINGS

FIG. 2 schematically shows a combustor section.

FIG. 3A shows a first cross-section.
FIG. 3B shows a second cross-section.
FIG. 3C shows a third cross-section.
FIG. 3D shows a fourth cross-section.

DETAILED DESCRIPTION

Figure 1:
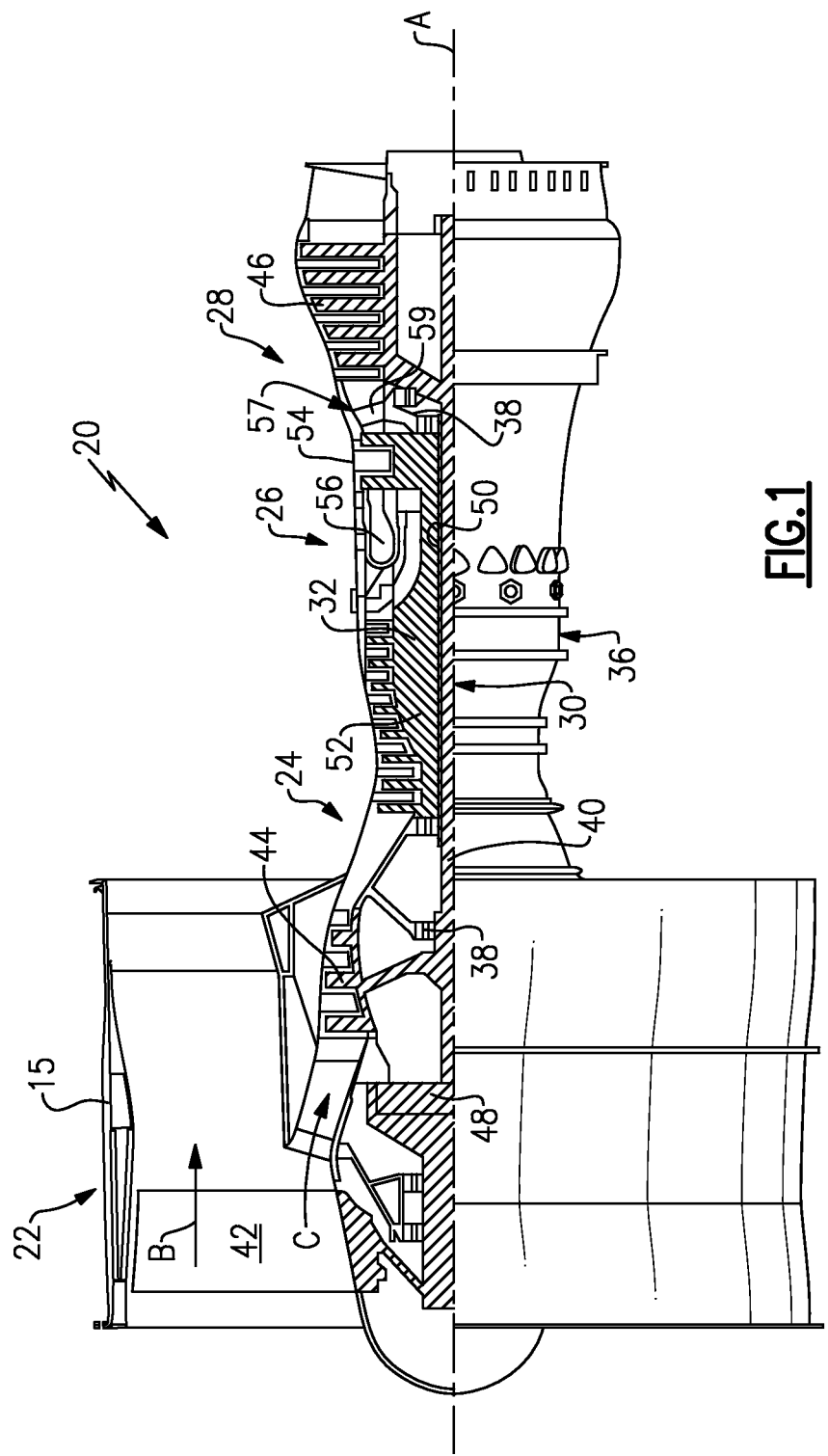
FIG. 1 schematically shows a gas turbine engine.

FIG. 1 schematically illustrates a propulsion gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with propulsion engines with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 feet (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 feet/second (350.5 meters/second).

FIG. 2 shows a combustor 100 having combustor chamber 104 with a front end or pilot injector 102 at an upstream end 103. A single main injector 106 is illustrated at a radially outer edge of the combustion chamber 104. It should be understood that there would typically be main injectors spaced circumferentially about the combustion chamber 104. A supply of air 108 and a supply of fuel 110 passes into a flow chamber or flow area 107 of the injector 106. A central plug 112 restricts the flow through a central portion of the flow area 107.

The supply of the air 108 and fuel 110 is schematic. Any number of other options may be utilized. However, generally the air and fuel are pre-mixed within the space 107 before entering the chamber 104.

As shown, a flame 116 from the pilot injector 102 and a flame 114 from the main injector 106 are spaced, with the pilot flame igniting and supporting the main flame.

In the prior art, there has been a circular port for the main injector 106. Such a port provided a longer flame, as described below, and raised challenges with longer combustors. Also, they raise sensitivities as to the distance between a main flame and pilot flame.

FIG. 3A shows a first embodiment 106 wherein the flow area 107 has a generally concentric mounted central plug 112 within an outer housing 111.

FIG. 3B shows another embodiment 120 wherein the flow area 121 has a flat leading edge 122. A leading edge of said flow path is generally flat, with a remainder of a circumference of the flow path being generally circular.

FIG. 3C shows another embodiment wherein the flow area 126 is defined by housing 99 which is non-concentric with the plug 112.

FIG. 3D shows yet another embodiment wherein the flow area 130 has an open leading edge due to a plug extension 128 from the plug 130.

Figure 4A:
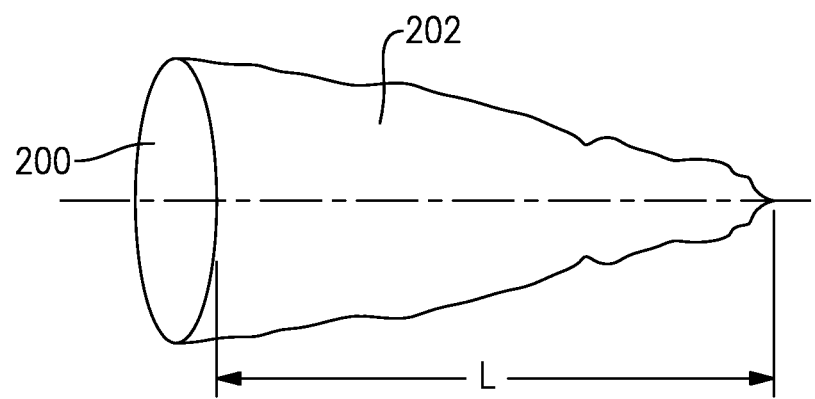
FIG. 4A shows a prior art injector.
Figure 4B:
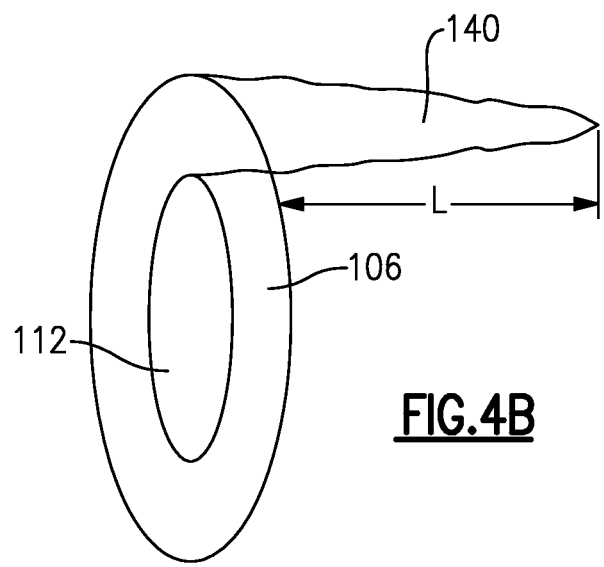
FIG. 4B shows one embodiment of the current disclosed injector.

As mentioned above, with the prior art circular port 200, as shown in FIG. 4A, the flame 202 was relatively long. FIG. 4B shows the embodiment 106 having a flame 140 which is relatively shorter due to increased surface area for burning and mixing. This provides benefits of a shorter combustor as well as a better temperature profile at the combustor exit. In addition, the recirculation zone created by the plug provides a flame anchoring mechanism for the main flame, so that main flame is less sensitive to disturbance from the pilot flame.

Figure 5C:
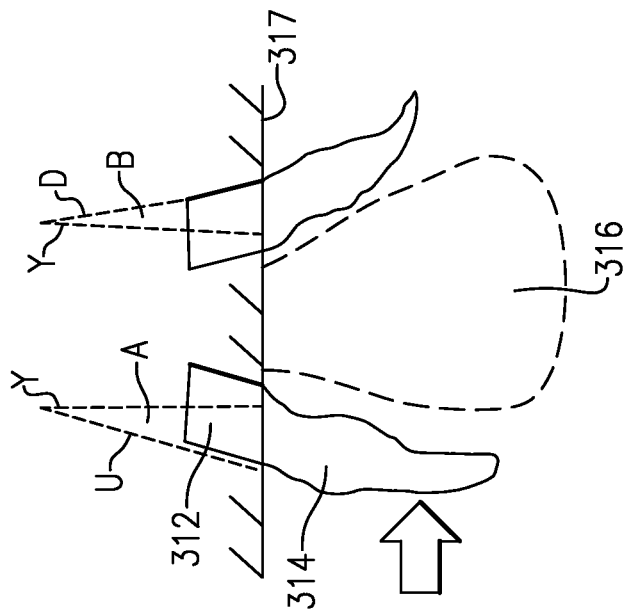
FIG. 5C shows a third option.
Figure 5B:
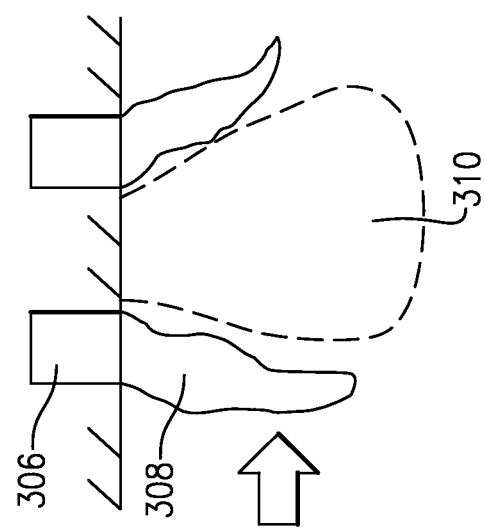
FIG. 5B shows a second option.
Figure 5A:
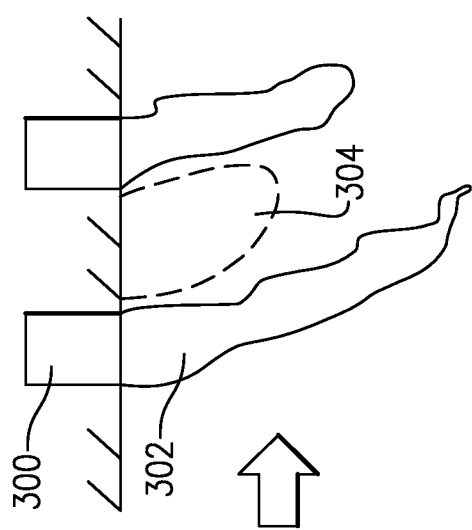
FIG. 5A shows a first option.

As shown in FIG. 5A, in one option 300, the main injector may provide no swirl to the flame 302, such that a central recirculation zone 304 is relatively small.

On the other hand, as shown in FIG. 5B, the main injector 306 may provide swirl to the size of increase recirculation zone 310 so that the flame 308 is shorter than the FIG. 5A embodiment. Due to the added plug, the swirling strength or swirl number can be significantly higher without backflow, which causes flame flashback.

FIG. 5C shows a main injector embodiment 312 wherein the main injector extends outwardly at an angle A which is non-perpendicular or parallel to a center of the combustion chamber, or to an inner wall 317 through which the main injector 312 extends. The main injector extends into a combustion chamber at an angle that is non-parallel and non-parallel to an inner wall of the main combustor through which the main injector extends, such that a direction of intermixed fuel and air is expanding as it enters a combustion chamber. As shown, an upstream end of the cross-section of FIG. 5C has the port extending at an angle U relative to a perpendicular axis Y. The included angle A directs the fuel in an opposed direction from an included angel B between the perpendicular axis Y and the downstream end D of the port. Since these opposed directions occur across the circumference of the injector 312, the flame will expand as illustrated. The main injector 312 may also provide swirl to further increase the size of recirculation zone 316.

This may result as an expanding flame 314 having an increased recirculation zone 316. The options of FIGS. 5A-5C may be utilized with any one of the embodiments of FIG. 3A-3D, or other embodiments.

A worker of ordinary skill in the art would recognize how to impart swirl into the exiting mixed fuel and air.

Broadly, combustor 100 for a gas turbine engine comprises a combustion chamber 107 having a pilot injector 102 at one end and at least one main injector 106 spaced radially from the pilot injector. The main injector includes a fluid flow path with a plug 112 restricting flow at least at an interior portion of the flow path.

With the plug within an interior portion of the flow path, for an equal exit area, the hydraulic dynamic of the port is smaller and flame burning and mixing surface area increases, resulting in improved burning, mixing and performance. The pre-mixed main flame is better anchored on its own due to recirculation zone on the back of the plug, which also enhances stability, burning and mixing. It is also easier to achieve a high degree of pre-mixing at the main injector and is easier to scale up the annular main injector. An annular swirl injector can have a much higher swirl number without flashback compared to the prior art which provides design flexibility.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A combustor for a gas turbine engine comprising:
a combustion chamber having a pilot injector at one end and at least one main injector spaced radially from said pilot injector, said main injector including a fluid flow path with a plug restricting flow at least at an interior portion of said flow path;
said fluid flow path being outward of said plug such that compressed air and fuel are mixed in said fluid flow path outward of said plug;
said combustion chamber surrounding a central axis, and said at least one main injector extending into a radial wall of said combustion chamber with said pilot injector entering an upstream axial wall of said combustion chamber; and
said plug having a back at a location where said at least one main injector enters said combustion chamber to prevent flow of fluid through said plug from entering said combustion chamber, and said back creating a recirculation zone within the mixed compressed air and fuel within said combustion chamber.

2. The combustor as set forth in claim 1, wherein said plug is concentric within said fluid flow path.

3. The combustor as set forth in claim 1, wherein a leading edge of said fluid flow path is flat, with a remainder of a circumference of said flow path being generally circular.

4. The combustor as set forth in claim 1, wherein said plug includes an extension extending to provide a restricted portion at a leading edge of said fluid flow path.

5. The combustor as set forth in claim 1, wherein said main injector extending into the combustion chamber at an angle that is non-perpendicular and non-parallel to said radial wall of said combustion chamber through which said at least one main injector extends.

6. The combustor as set forth in claim 1, wherein the mixed compressed air and fuel results in a flame in said combustion chamber, and said recirculation zone being centered within said flame to increase a surface area of said flame.

7. The combustor as set forth in claim 1, wherein said at least one main injector injects the mixed compressed air and fuel into said combustion chamber.

8. The combustor as set forth in claim 7, wherein said at least one main injector does not import swirl into the mixed compressed air and fuel.

9. The combustor as set forth in claim 7, wherein said at least one main injector induces swirl into the mixed compressed air and fuel.

10. The combustor as set forth in claim 7, wherein said pilot injector injects said fuel.

11. A combustor for a gas turbine engine comprising:
a combustion chamber having a pilot injector at one end and at least one main injector spaced radially from said pilot injector, said main injector including a fluid flow path with a plug restricting flow at least at an interior portion of said flow path;
said fluid flow path being outward of said plug such that compressed air and fuel are mixed in said fluid flow path outward of said plug;
said combustion chamber surrounding a central axis, and said at least one main injector extending into a radial wall of said combustion chamber with said pilot injector entering an upstream axial wall of said combustion chamber;
said plug having a back at a location where said at least one main injector enters said combustion chamber to prevent flow of fluid through said plug from entering said combustion chamber; and
wherein said plug is mounted non-concentrically within said fluid flow path.

12. A gas turbine engine comprising:
a compressor, a turbine, and a combustor section for receiving compressed air from said compressor and mixing the compressed air with fuel, the combustor section including a combustion chamber having a pilot injector at one end and at least one main injector spaced radially from said pilot injector, said main injector including a fluid flow path with a plug restricting flow at least at an interior portion of said flow path;
said fluid flow path being outward of said plug such that said compressed air and said fuel are mixed in said fluid flow path outward of said plug;
said combustion chamber surrounding a central axis, and said at least one main injector extending into an upstream axial wall of said combustion chamber with said pilot injector entering an axial wall of said injector; and
said plug having a back at a location where said at least one main injector enters said combustion chamber to prevent flow of fluid through said plug from entering said combustion chamber, and said back creating a recirculation zone within the mixed compressed air and fuel within said combustion chamber.

13. The gas turbine engine as set forth in claim 12, wherein said plug is concentric within said fluid flow path.

14. The gas turbine engine as set forth in claim 12, wherein a leading edge of said fluid flow path is generally flat, with a remainder of a circumference of said fluid flow path being circular.

15. The gas turbine engine as set forth in claim 12, wherein said plug includes an extension extending to provide a restricted portion at a leading edge of said fluid flow path.

16. The gas turbine engine as set forth in claim 12, wherein said at least one main injector injects the mixed compressed air and fuel into said combustion chamber.

17. The gas turbine engine as set forth in claim 16, wherein said at least one main injector does not import swirl into the mixed compressed air and fuel.

18. The gas turbine engine as set forth in claim 16, wherein said at least one main injector induces swirl into the mixed compressed air and fuel.

19. The gas turbine engine as set forth in claim 12, wherein said main injector extending into said combustion chamber at an angle that is non-perpendicular and non-parallel to wall of said combustion chamber through which said main injector extends.

20. The gas turbine engine as set forth in claim 12, wherein the mixed compressed air and fuel results in a flame in said combustion chamber, and said recirculation zone being centered within said flame to increase a surface area of said flame.

* * * * *